(12) United States Patent
Dempsey et al.

(10) Patent No.: US 10,775,071 B2
(45) Date of Patent: Sep. 15, 2020

(54) ENERGY RECOVERY VENTILATOR

(71) Applicant: Carrier Corporation, Farmington, CT (US)

(72) Inventors: Daniel J. Dempsey, Carmel, IN (US); Dwight H. Heberer, Brownsburg, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 275 days.

(21) Appl. No.: 14/146,773

(22) Filed: Jan. 3, 2014

(65) Prior Publication Data

US 2014/0190670 A1    Jul. 10, 2014

Related U.S. Application Data

(60) Provisional application No. 61/748,934, filed on Jan. 4, 2013.

(51) Int. Cl.
*F24F 13/00*     (2006.01)
*F24F 12/00*     (2006.01)

(52) U.S. Cl.
CPC ........... *F24F 12/006* (2013.01); *Y02B 30/563* (2013.01)

(58) Field of Classification Search
CPC .............................. F24F 12/006; Y02B 30/563
See application file for complete search history.

(56) References Cited

U.S. PATENT DOCUMENTS

| | | | | |
|---|---|---|---|---|
| 4,377,201 A | * | 3/1983 | Kruse | F24F 12/006 165/166 |
| 4,429,735 A | * | 2/1984 | Nomaguchi | F24F 12/001 165/60 |
| 4,513,809 A | | 4/1985 | Schneider et al. | |
| 5,002,118 A | * | 3/1991 | Olmstead | F24F 12/006 165/166 |
| 5,070,934 A | | 12/1991 | Kucharczyk | |
| 5,193,610 A | * | 3/1993 | Morissette | F24F 12/006 165/166 |

(Continued)

FOREIGN PATENT DOCUMENTS

| | | |
|---|---|---|
| CN | 101509686 A | 8/2009 |
| CN | 202171307 U | 3/2012 |
| KR | 100939591 B1 | 2/2010 |

OTHER PUBLICATIONS

ASHRAE 62.2 Disclosure/Spec Sheet; Sep. 2012; 1 page; www.renwaire.com.
EV90 Spec Sheet, RenewAire, Sep. 2012, 1 page. www.renwaire.com.

*Primary Examiner* — Edelmira Bosques
*Assistant Examiner* — Phillip Decker
(74) *Attorney, Agent, or Firm* — Cantor Colburn LLP

(57) ABSTRACT

An energy recovery ventilator for a heating or cooling system includes a housing and a heat exchanger located in the housing for recovery of thermal energy from a stale airflow of the heating or cooling system. An exhaust fan positioned in the housing is in flow communication with the heat exchanger to urge the stale airflow from a return port disposed in a first side panel of the housing, across the heat exchanger and toward an exhaust port of the energy recovery ventilator. The exhaust fan and the heat exchanger are configured such that the heat exchanger is removable from the housing via a front panel opening in the housing without disturbing a position of the exhaust fan.

16 Claims, 5 Drawing Sheets

(56) References Cited

U.S. PATENT DOCUMENTS

| | | | | |
|---|---|---|---|---|
| 5,301,744 A * | 4/1994 | Derks | F24F 13/20 | 165/137 |
| 5,490,557 A * | 2/1996 | Taylor | F24F 12/006 | 165/54 |
| 5,632,334 A * | 5/1997 | Grinbergs | F24F 12/006 | 165/232 |
| 6,289,974 B1 | 9/2001 | DeGregoria et al. | | |
| 6,575,228 B1 | 6/2003 | Ragland et al. | | |
| 6,855,050 B2 * | 2/2005 | Gagnon | F04D 25/166 | 454/69 |
| 6,948,553 B1 * | 9/2005 | Day | F24F 12/006 | 454/249 |
| 6,966,356 B2 | 11/2005 | Yeung | | |
| 7,090,000 B2 | 8/2006 | Taylor | | |
| 7,575,044 B2 * | 8/2009 | Choi | F24F 12/006 | 165/103 |
| 7,802,443 B2 * | 9/2010 | Wetzel | F24F 1/022 | 454/196 |
| 7,878,236 B1 * | 2/2011 | Breen | F24F 11/008 | 165/288 |
| 8,939,826 B2 * | 1/2015 | Zorzit | F24F 1/0007 | 454/237 |
| 9,206,991 B2 * | 12/2015 | McKie | F24F 3/1423 | |
| 9,222,695 B2 * | 12/2015 | Hasegawa | F24F 12/006 | |
| 9,995,538 B2 * | 6/2018 | Heberer | F28F 9/0075 | |
| 10,041,743 B2 * | 8/2018 | Heberer | F24F 12/006 | |
| 10,184,684 B2 * | 1/2019 | Kurelowech | F24F 12/006 | |
| 2005/0133204 A1 * | 6/2005 | Gates | F24F 12/006 | 165/108 |
| 2006/0199510 A1 * | 9/2006 | Choi | F24F 7/08 | 454/237 |
| 2006/0199511 A1 * | 9/2006 | Chung | F24F 12/006 | 454/237 |
| 2009/0029642 A1 * | 1/2009 | Martel | F24F 12/006 | 454/358 |
| 2009/0101727 A1 * | 4/2009 | Boudreau | F24F 12/006 | 700/278 |
| 2011/0155343 A1 * | 6/2011 | Boudreau | F24F 12/00 | 165/10 |
| 2012/0178355 A1 | 7/2012 | Kim et al. | | |
| 2012/0196523 A1 | 8/2012 | Jiang et al. | | |
| 2012/0216558 A1 | 8/2012 | Dempsey et al. | | |
| 2012/0253526 A1 | 10/2012 | Storm | | |
| 2013/0017774 A1 * | 1/2013 | Zorzit | F24F 12/006 | 454/237 |
| 2013/0248160 A1 * | 9/2013 | Eplee | F28D 9/0025 | 165/165 |
| 2014/0190656 A1 * | 7/2014 | Heberer | F24F 12/006 | 165/4 |
| 2014/0190657 A1 * | 7/2014 | Heberer | F24F 12/006 | 165/4 |
| 2014/0374065 A1 * | 12/2014 | Heberer | F24F 12/006 | 165/104.14 |

* cited by examiner

ENERGY RECOVERY VENTILATOR

BACKGROUND OF THE INVENTION

Embodiments relate generally to heat exchangers and, more particularly, to an energy recovery ventilator ("ERV") that attaches directly to an existing furnace, fan coil or air handler and uses two duct connections for recovering energy from indoor air, and includes an impeller to urge exhaust flow from the ERV.

An ERV is generally used with a heating or cooling system to exhaust stale air from a stale air space to a fresh air space and bring in fresh air from the fresh air space to the stale air space while exchanging heat or cool energy, thereby reducing heating or cooling requirements. Typically, an ERV includes a heat exchanger contained in a housing for exchanging heat or cool energy. When the ERV is used with a heating or cooling system, an outside air stream from the outdoors and a stale room air stream from the return air duct separately enter the ERV and pass through the heat exchanger. Within the heat exchanger, energy from the stale room air stream is transferred either to or from the outside air stream. The outside air stream then exits the ERV to the supply air duct as a fresh air stream. The stale room air stream then exits the ERV to the outdoors as an exhaust room air stream.

Most residential ERVs are mounted on a wall or ceiling and generally require four duct pipes to exchange cool or heat energy with an air handler system. In an example, the outside air stream and the stale room air stream enter the housing through duct pipes connected to two air flow openings in the housing. The fresh air stream and the exhaust room air stream exit the housing through two other duct pipes connected to two other air flow openings in the housing. These ERVs are standalone heat exchangers that are remotely mounted from the heating or cooling system and are not designed to be connected directly to a furnace or an air handler in a heating or cooling system. As connected to the heating or cooling system, this ERV is costly and cumbersome to install as it requires the installation of four separate duct pipes to carry each air stream to or from the fresh air or stale air spaces.

BRIEF DESCRIPTION OF THE INVENTION

According to one aspect of the invention, an energy recovery ventilator for a heating or cooling system includes a housing and a heat exchanger located in the housing for recovery of thermal energy from a stale airflow of the heating or cooling system. An exhaust fan positioned in the housing is in flow communication with the heat exchanger to urge the stale airflow from a return port disposed in a first side panel of the housing, across the heat exchanger and toward an exhaust port of the energy recovery ventilator. The exhaust fan and the heat exchanger are configured such that the heat exchanger is removable from the housing via a front panel opening in the housing without disturbing a position of the exhaust fan.

According to another aspect of the invention, an energy recovery system includes a heating or cooling system including a furnace or fan coil, a blower compartment including a blower to urge airflow across the furnace or fan coil, and a return air duct to direct return air from a conditioned space to the blower compartment. An energy recovery ventilator is coupled to a component of the heating or cooling system and includes a housing and a heat exchanger located in the housing for recovery of thermal energy from a stale airflow of the heating or cooling system. An exhaust fan is positioned in the housing in flow communication with the heat exchanger to urge the stale airflow from a return port disposed in a first side panel of the housing, across the heat exchanger and toward an exhaust port of the energy recovery ventilator. The exhaust fan and the heat exchanger are configured such that the heat exchanger is removable from the housing via a front panel opening in the housing without disturbing a position of the exhaust fan.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
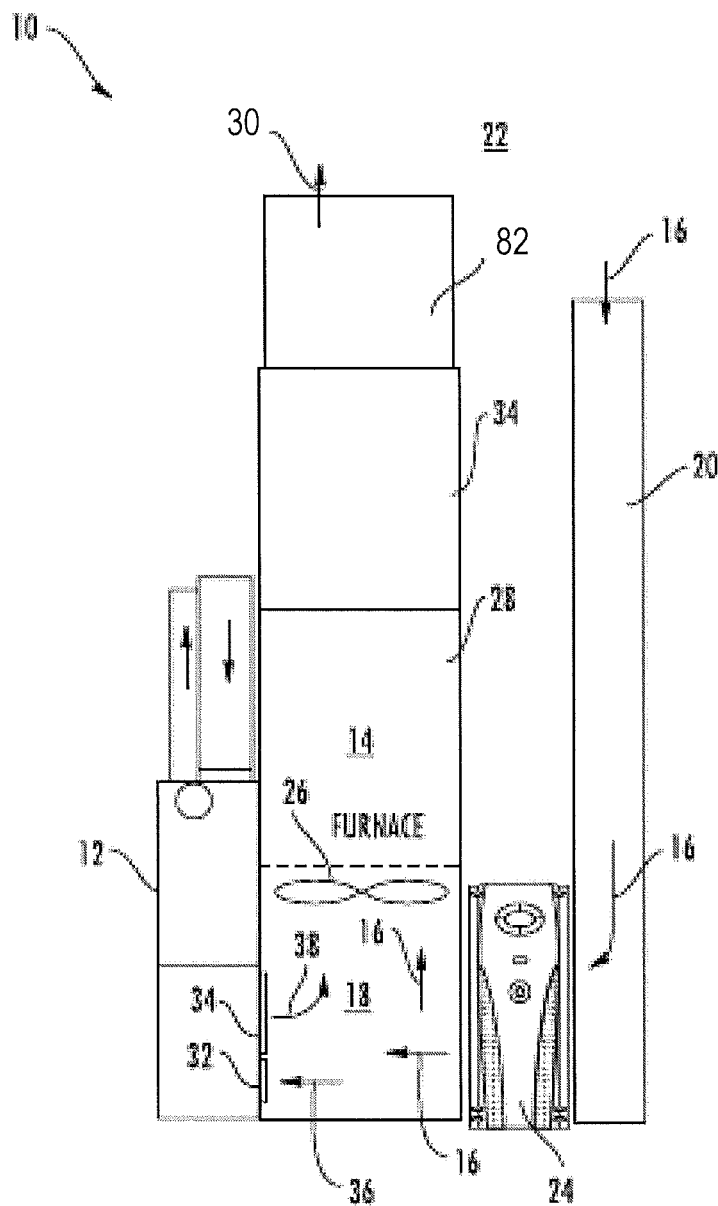
FIG. 1 is a schematic view of an embodiment of a heating or cooling system including an energy recovery ventilator (ERV)

Shown in FIG. 1 is an embodiment of a heating or cooling system 10 including an energy recovery ventilator (ERV) 12. The heating or cooling system 10 includes a furnace/fan coil 14 receiving an air flow 16 from a circulation blower compartment 18. The blower compartment 18 is, in turn, connected to a return air duct 20, which conveys the air flow 16 from a conditioned space 22. In some embodiments, an air cleaner such as an air purifier 24 is provided to filter the air flow 16 entering the blower compartment 18. While in the embodiment of FIG. 1, the air purifier 24 is located upstream of the blower compartment 18, it is to be appreciated that, in other embodiments the air purifier 24 may be placed in other locations in the heating or cooling system 10, such as upstream of the blower compartment 18 or upstream of the furnace/fan coil 14 or in the return air duct 20. A circulation air blower 26 in the blower compartment 18 urges the air flow 16 from the blower compartment 18, into a furnace/fan coil compartment 28 where the air flow is conditioned by the furnace/fan coil 14 resulting in a conditioned airflow 30. The conditioned airflow 30 is urged to the conditioned space 22 through an air supply duct 82.

In the embodiment of FIG. 1, the ERV 12 is connected directly to the blower compartment 18 and includes a return port 32, through which a stale airflow 36, which is a portion of air flow 16, flows from the blower compartment 18 into the ERV 12. Further, the ERV 12 is connected directly to the blower compartment 18 via a supply port 34, through which a fresh airflow 38 flows from the ERV 12 and into the blower compartment 18.

Figure 2:
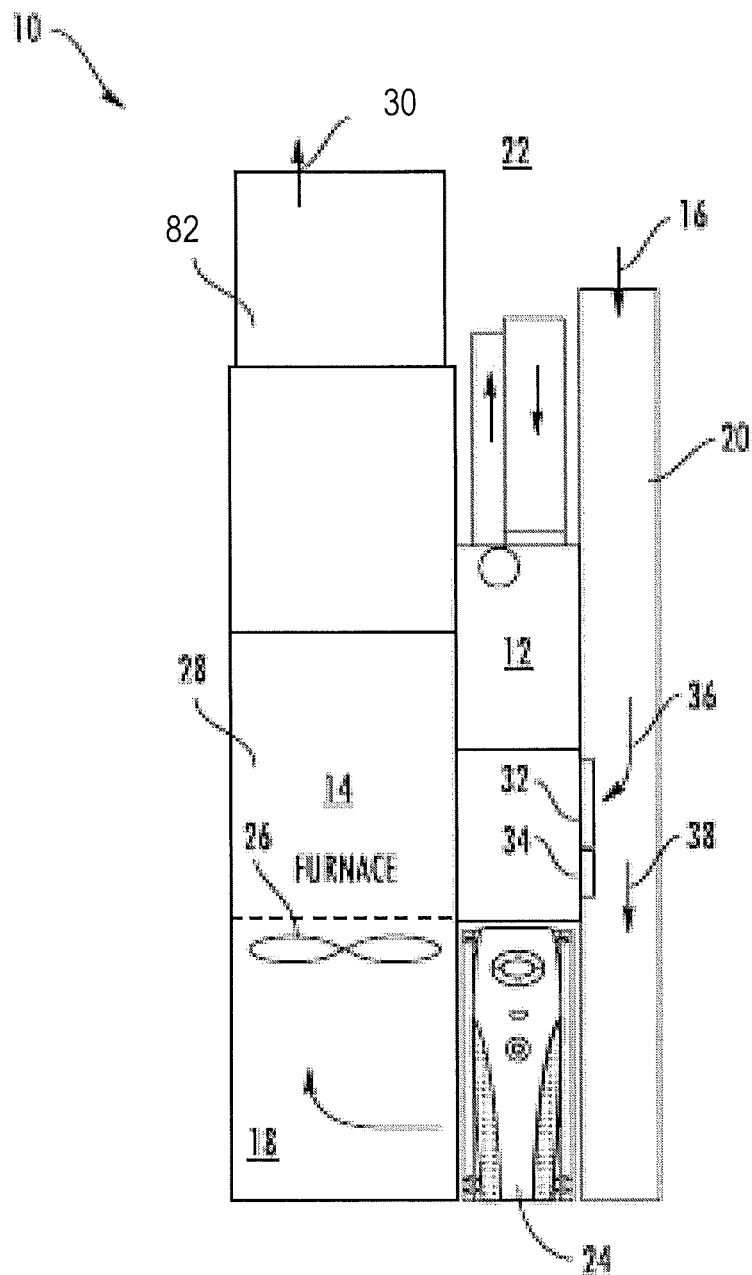
FIG. 2 is a schematic view of another embodiment of a heating or cooling system including an ERV.

In another embodiment, as shown in FIG. 2, the ERV 12 may be directly connected to the return air duct 20 as an alternative to being directly connected to the blower compartment 18. In this embodiment, stale airflow 36 flows from the return air duct 20 into the ERV 12 via the return port 32 and fresh airflow 38 flows from the ERV 12 into the return air duct 20 via the supply port 34.

Figure 3:
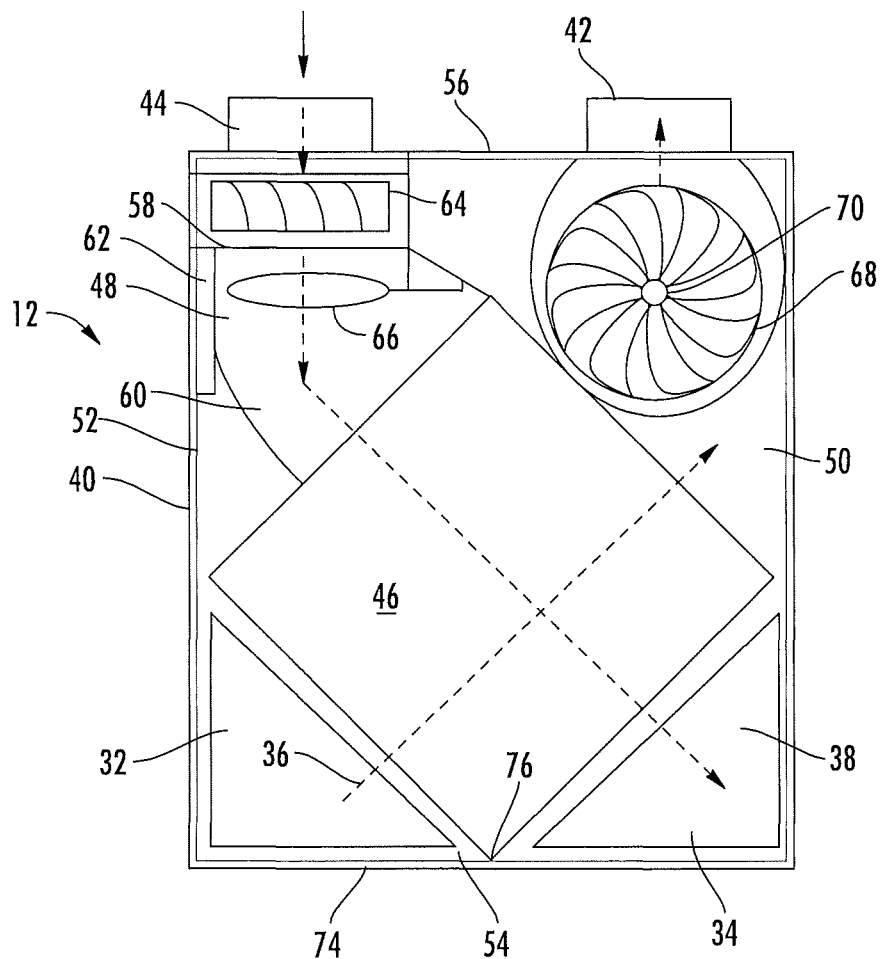
FIG. 3 is a cross-sectional side view of an embodiment of an ERV.

FIG. 3 illustrates in more detail the ERV 12 used with heating or cooling system 10. The ERV 12 is utilized to circulate the fresh airflow 38 into the heating or cooling system 10, while recovering energy from the stale airflow 36. The ERV 12 includes an ERV housing 40, and an exhaust port 42 and fresh air port 44. Further, the ERV 12 includes a heat exchanger 46 located in the ERV housing 40. The fresh airflow 38 flows through the ERV 12 from the fresh air port 44 to the supply port 34 across the heat exchanger 46 via a fresh air pathway 48. Similarly, the stale airflow 36 flows from the return port 32 to the exhaust port 42 across the heat exchanger 46 via an exhaust pathway 50. Thermal energy is transferred between the fresh airflow 38 and the stale airflow 36 at the heat exchanger 46.

Figure 4:
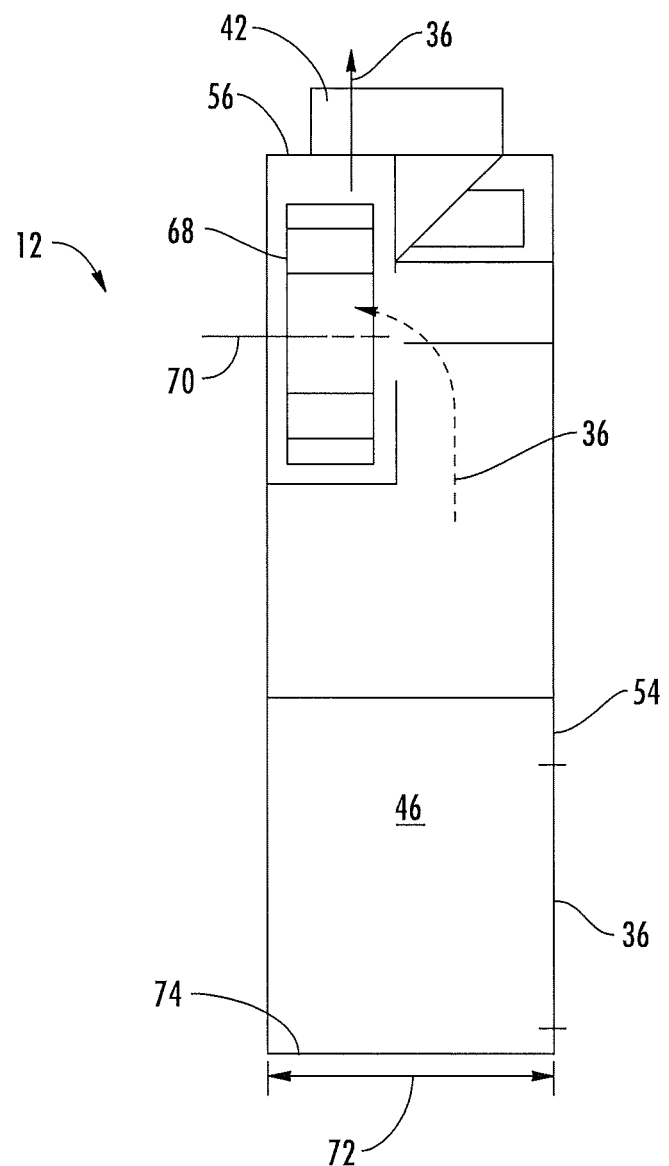
FIG. 4 is a cross-sectional end view of an embodiment of an ERV.
Figure 5:
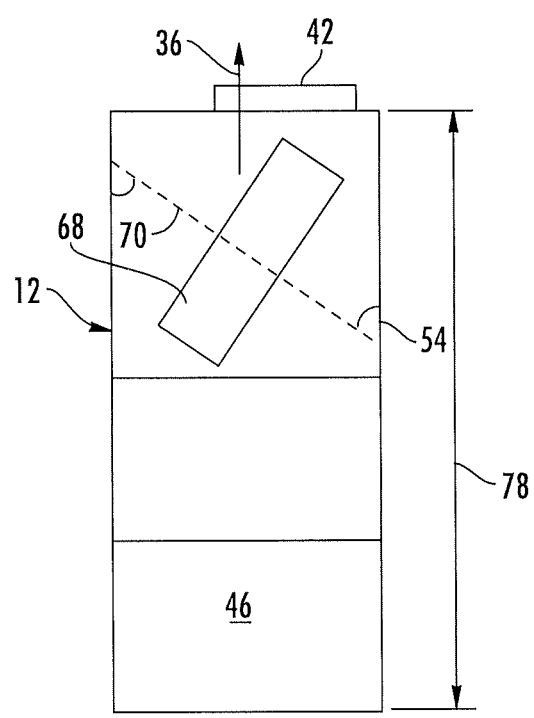
FIG. 5 is a cross-sectional end view of another embodiment of an ERV.

The ERV 12 is uniquely configured to be horizontally narrow upon installation to the heating or cooling system 10, and modularized to allow for ease of service of the components of the ERV 12. The ERV housing 40 includes a removable front panel 52. The supply port 34 and the return port 32 are both located in a first side panel 54 of the ERV housing 40, and the fresh air port 44 and the exhaust port 42 are located at a top panel 56 of the ERV housing 40. A controls tray 58 including a fresh air duct 60, ERV control system 62, and in some embodiments, a supply fan 64 to urge the fresh airflow 38 into the fresh air port 44, is located behind the front panel 52. In some embodiments, the fresh air duct 60 includes a fresh air damper 66 to regulate flow into the fresh air duct 60. In some embodiments, the controls tray 58 is removable from the ERV housing 40 as a unit allowing for access to and removal from the ERV housing 40 of the heat exchanger 46 located at least partially behind the controls tray 58 in the ERV housing 40. Access to and removal of the heat exchanger 46 allows for easy service and maintenance such as cleaning or replacement of filters (not shown). Removal of the heat exchanger 46 also allows for access to an exhaust fan, in some embodiments an impeller 68, which urges the stale airflow 36 through the heat exchanger 46 and out of the ERV 12 via the exhaust port 42. The impeller 68 is mounted transversely in the ERV housing 40 with a fan central axis 70 directed toward the first side panel 54. Mounting the impeller 68 transversely allows the ERV housing 40 to be narrower in width 72 (as shown in FIG. 4), while still allowing the impeller 68 to be sized large enough to accommodate a selected stale airflow 36 rate and mass flow. In some embodiments, the width 72 is about 5-12 inches (12.5 to 30.5 cm). In one embodiment, the width 72 is about 7 inches (17.75 cm). In some embodiments, an aspect ratio of a height of the from panel 52 to the width of the front panel 52 is greater than one. In some embodiments, as shown in FIG. 4, an angle between the fan central axis 70 and the first side panel 54 is 90 degrees. In other embodiments, as shown in FIG. 5, the fan central axis 70 extends toward the first side panel 54 at an angle not equal to 90 degrees. Locating the impeller at such an angle, for example, between about 45 degrees and 90 degrees, allows a height 78 of the ERV 12 to be reduced compared to an ERV with a transversely-mounted impeller 68, while still reducing the width 72 of the ERV 12 compared to an ERV having an impeller mounted horizontally. Further, in some embodiments, the supply fan 64 is similarly mounted transversely, or at an angle relative to the first side panel 54.

Referring again to FIG. 3, the heat exchanger 46 is rectangular or, in some embodiments, square in shape and is diagonally mounted in the ERV housing 40 with a first corner 76 resting on or located near a bottom panel 74 of the ERV housing 40. In this embodiment, the controls tray 58 and the impeller 68 are located above the heat exchanger 46 in the ERV housing 46. It is to be appreciated that, in other embodiments, the arrangement may be substantially reversed, with the fresh air port 44 and the exhaust port 42 are located at the bottom panel 74 along with the controls tray 58 and the impeller 68 while the first corner 76 of the heat exchanger 46 is located at the top panel 56.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An energy recovery ventilator for a heating or cooling system comprising:
   a housing having a front panel, a top panel and a rear panel;
   a heat exchanger disposed in the housing for recovery of thermal energy from a stale airflow of the heating or cooling system;
   an exhaust fan disposed in the housing vertically between the heat exchanger and the top panel and horizontally between the heat exchanger and the rear panel, the exhaust fan in flow communication with the heat exchanger to urge the stale airflow from a return port across the heat exchanger and toward an exhaust port of the energy recovery ventilator; and
   a controls tray disposed in the housing between the front panel and the heat exchanger, such that the controls tray is removable through the front panel opening prior to removal of the heat exchanger;
   wherein the top panel is perpendicular to a first side panel, both the exhaust port and a fresh inlet air port are in the top panel of the housing, the return port and a supply air outlet port both disposed in the first side panel perpendicular to the top panel, the exhaust fan and the heat exchanger are configured such that the heat exchanger is removable from the housing via a front panel opening in the front panel without disturbing a position of the exhaust fan;
   wherein the controls tray further includes:
     a supply fan to urge a fresh air flow into the energy recovery ventilator via the fresh air port, the supply fan located upstream of the heat exchanger relative to a flow direction of the fresh airflow from the fresh air port to the heat exchanger; and
     a fresh air damper disposed in a fresh air duct between the supply fan and the energy recovery ventilator.

2. The energy recovery ventilator of claim 1, wherein the exhaust fan is an impeller.

3. The energy recovery ventilator of claim 1, wherein the exhaust fan has an axis of rotation extending toward the first side panel of the housing at an angle between about 45 degrees and 90 degrees.

4. The energy recovery ventilator of claim 1, wherein the controls tray includes ERV control components.

5. The energy recovery ventilator of claim 1, wherein the supply fan has an axis of rotation extending toward the first side panel of the housing at an angle between about 45 degrees and 90 degrees.

6. The energy recovery ventilator of claim 1, wherein a width of the front panel of the energy recovery ventilator is in the range of 5 to 12 inches.

7. The energy recovery ventilator of claim 6, wherein an aspect ratio of a height of the front panel to the width of the front panel is greater than 1.

8. An energy recovery system comprising:
a heating or cooling system including:
  a furnace or fan coil;
  a blower compartment including a blower to urge airflow across the furnace or fan coil; and
  a return air duct to direct return air from a conditioned space to the blower compartment; and
an energy recovery ventilator coupled to a component of the heating or cooling system including:
  a housing having a front panel, a top panel and a rear panel;
  a heat exchanger disposed in the housing for recovery of thermal energy from a stale airflow of the heating or cooling system;
  an exhaust fan disposed in the housing vertically between the heat exchanger and the top panel and horizontally between the heat exchanger and the rear panel, the exhaust fan in flow communication with the heat exchanger to urge the stale airflow from a return port across the heat exchanger and toward an exhaust port of the energy recovery ventilator; and
  a controls tray disposed in the housing between the front panel and the heat exchanger, such that the controls tray is removable through the front panel opening prior to removal of the heat exchanger;
wherein the top panel is perpendicular to a first side panel, both the exhaust port and a fresh inlet air port are in the top panel of the housing, the return port and a supply air outlet port both disposed in the first side panel perpendicular to the top panel, the exhaust fan and the heat exchanger are configured such that the heat exchanger is removable from the housing via a front panel opening in the front panel without disturbing a position of the exhaust fan;
wherein the controls tray further includes:
  a supply fan to urge a fresh air flow into the energy recovery ventilator via the fresh air port, the supply fan located upstream of the heat exchanger relative to a flow direction of the fresh airflow from the fresh air port to the heat exchanger; and
  a fresh air damper disposed in a fresh air duct between the supply fan and the energy recovery ventilator.

9. The energy recovery system of claim 8, wherein the energy recovery ventilator is coupled directly to the blower compartment via the return port and a supply port disposed at the first side panel.

10. The energy recovery system of claim 8, wherein the energy recovery ventilator is coupled directly to the return air duct via the return port and a supply port disposed at the first side panel.

11. The energy recovery system of claim 8, wherein the exhaust fan is an impeller.

12. The energy recovery system of claim 8, wherein the exhaust fan has an axis of rotation extending toward the first side panel of the housing at an angle between about 45 degrees and 90 degrees.

13. The energy recovery system of claim 8, wherein the controls tray includes ERV control components.

14. The energy recovery system of claim 8, wherein the supply fan has an axis of rotation extending toward the first side panel of the housing at an angle between about 45 degrees and 90 degrees.

15. The energy recovery system of claim 8 wherein a width of the front panel of the energy recovery ventilator is in the range of 5 to 12 inches.

16. The energy recovery system of claim 15, wherein an aspect ratio of a height of the front panel to the width of the front panel is greater than 1.

* * * * *